US010565155B2

(12) United States Patent
Wallichs et al.

(10) Patent No.: US 10,565,155 B2
(45) Date of Patent: Feb. 18, 2020

(54) DISTRIBUTED MULTI-DIE PROTOCOL APPLICATION INTERFACE

(71) Applicant: Altera Corporation, San Jose, CA (US)

(72) Inventors: Gary Brian Wallichs, San Jose, CA (US); Keith Duwel, San Jose, CA (US); Cora Lynn Mau, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 16/208,238

(22) Filed: Dec. 3, 2018

(65) Prior Publication Data
US 2019/0179792 A1 Jun. 13, 2019

Related U.S. Application Data

(63) Continuation of application No. 14/844,920, filed on Sep. 3, 2015, now Pat. No. 10,162,789.

(51) Int. Cl.
*G06F 13/42* (2006.01)
*H04L 29/06* (2006.01)
*G06F 5/06* (2006.01)
*H04L 12/947* (2013.01)

(52) U.S. Cl.
CPC .......... *G06F 13/4286* (2013.01); *G06F 5/065* (2013.01); *H04L 69/14* (2013.01); *H04L 49/25* (2013.01)

(58) Field of Classification Search
CPC .............................. H04L 69/14; G06F 13/4286
See application file for complete search history.

(56) References Cited

U.S. PATENT DOCUMENTS

| 6,188,699 B1 | 2/2001 | Lang et al. |
| 2010/0215086 A1 | 8/2010 | Vijayaraghavan et al. |
| 2011/0078483 A1* | 3/2011 | Islam ................. G06F 11/2236 713/400 |
| 2012/0027026 A1 | 2/2012 | Duwel et al. |
| 2015/0156141 A1 | 6/2015 | Michael et al. |
| 2015/0156284 A1 | 6/2015 | Akhter et al. |

FOREIGN PATENT DOCUMENTS

CN  1586022 A  2/2005

OTHER PUBLICATIONS

Extended EP Search Report for EP Application No. 16187034.0 dated Jan. 31, 2017; 8 pages.
Office Action for CN Application No. 201610908365.3 dated Dec. 19, 2018; 13 pages.

* cited by examiner

*Primary Examiner* — Zachary K Huson
(74) *Attorney, Agent, or Firm* — Fletcher Yoder, P.C.

(57) ABSTRACT

Systems and methods are provided for supporting wide-protocol interface across a multi-die interconnect interface. Data signals of a wide-protocol interface are split into a plurality of data streams. A handshake signal is established between a first circuit and a second circuit, whereby the first circuit and second circuit are dies of a multi-die device. The first circuit transmits the plurality of data streams to the second circuit via a plurality of multi-die interconnect channels. Each data stream of the plurality of data streams are compressed based on the handshake signal in order to provide wide-protocol interface with reduced number of required pins.

22 Claims, 5 Drawing Sheets

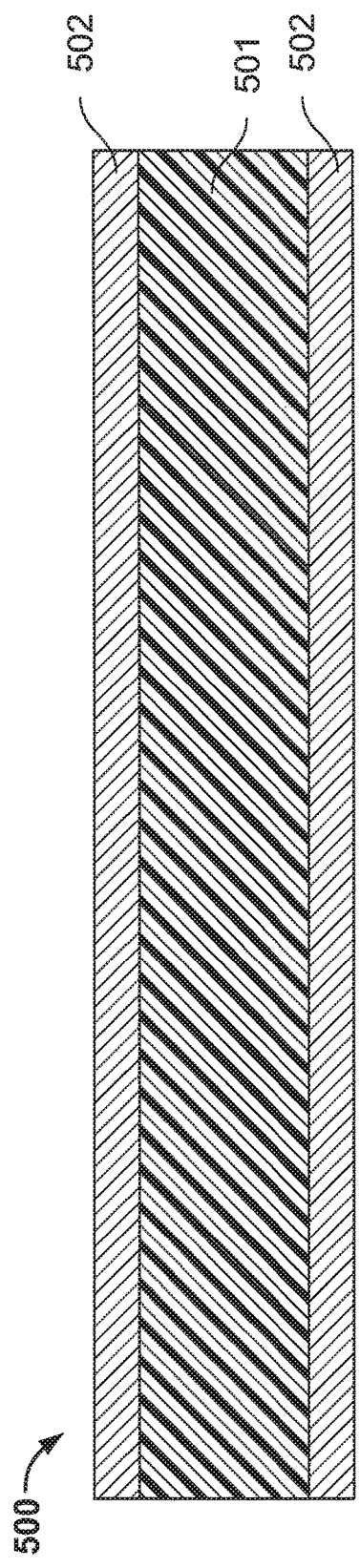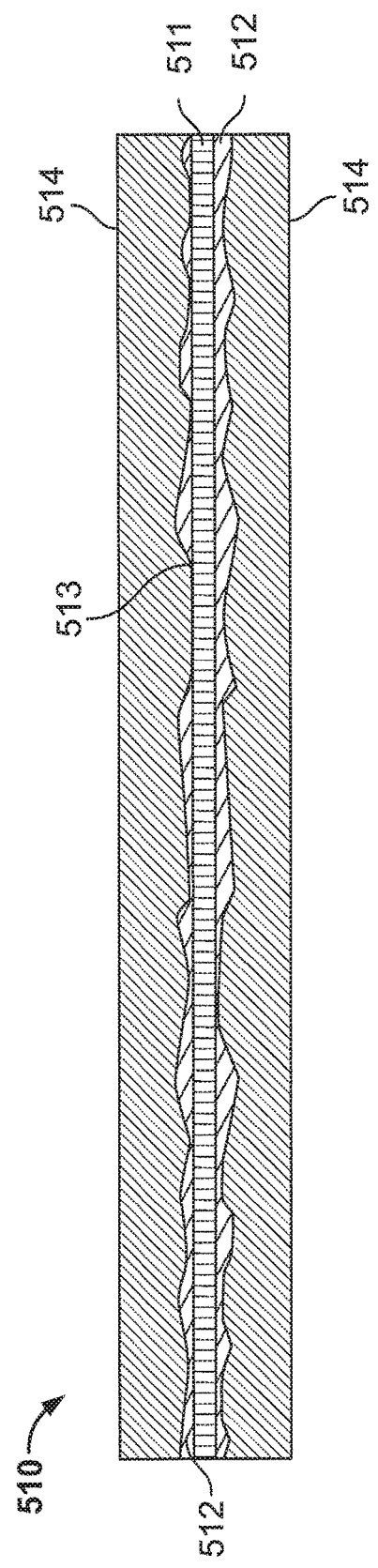

DISTRIBUTED MULTI-DIE PROTOCOL APPLICATION INTERFACE

CROSS-REFERENCE TO RELATED APPLICATION

This application is a continuation of U.S. patent application Ser. No. 14/844,920 filed on Sep. 3, 2015, which is incorporated by reference herein in its entirety for all purposes

FIELD OF THE INVENTION

This invention relates to multi-die integrated circuit devices, including programmable logic devices (PLD). In particular, this invention can be used in systems and methods for supporting multi-purpose signaling on such devices.

BACKGROUND OF THE INVENTION

Multiple integrated circuit (IC) dies can be connected using a multi-die interconnect. In some examples, the multi-die interconnect can be implemented as a channelized interface, where multiple channels are used to relay data signals among the multiple IC dies.

A protocol application layer stack can reside on one or more of the IC dies that are connected via the multi-die interconnect. In some modes, communication between two protocol application layer stacks is accomplished by way of the multi-die interconnect interface.

SUMMARY OF THE INVENTION

The present invention supports multi-purpose data signaling across a channelized interface such as the multi-die interconnect. In some implementations, several channels of the multi-die interconnect can be aggregated to support a wide-protocol bus interface from the protocol application layer.

A particular challenge in supporting the wide-protocol bus interface across multiple IC dies is that multi-die interconnects are typically implemented as narrow, independent, and asynchronous channels. Parallel data bits in a wide-protocol bus interface must be divided and redistributed across different channels of the multi-die interconnect in order to be transmitted. Furthermore, the asynchronous first-in-first-out devices (FIFOs) that are used to drive channels of the multi-die interconnect interface have the potential to introduce skew into the data streams because the channels operate independently and asynchronously of each other.

Therefore, in accordance with embodiments of the present invention, there is provided a method for supporting a wide-protocol interface across a multi-die interconnect. Data signals of the wide-protocol interface are split into a plurality of data streams. A handshake signal is established between a first circuit and a second circuit residing on IC dies of a multi-die device. The first circuit transmits the plurality of data streams to the second circuit via a plurality of channels of the multi-die interconnect interface. The plurality of channels of the multi-die interconnect interface may be "bonded" by shared synchronization signals in order to reduce skew in the plurality of data streams. Each data stream of the plurality of data streams is compressed based on the handshake signal in order to provide a wide-protocol interface with a reduced number of required pins.

While each data stream of the plurality of data streams is compressed, a first data stream of the plurality of data streams is driven through a first FIFO at a 2:1 speed-up rate and through a second FIFO at a 1:2 slow-down rate. A second data stream of the plurality of data streams is driven through a third FIFO at a 2:1 speed-up rate and through a fourth FIFO at a 1:2 slow-down rate. In some embodiments, the first FIFO and the third FIFO are bonded by a first pair of shared synchronization signals, and the second FIFO and the fourth FIFO are bonded by a second pair of shared synchronization signals.

In some embodiments, the capacity remaining in a protocol layer FIFO is determined, and a back-pressure latency associated with the first FIFO and the second FIFO also is determined based on the handshake signal. In some embodiments, the capacity remaining in the protocol layer FIFO is adjusted based on the determined back-pressure latency.

In some embodiments, the handshake signal is established between the first circuit and the second circuit via a serial-shift chain. In some further embodiments, control signals associated with the data signals of the wide-protocol interface are collected and split across the plurality of data streams.

BRIEF DESCRIPTION OF THE DRAWINGS

Further features of the invention, its nature and various advantages will be apparent upon consideration of the following detailed description, taken in conjunction with the accompanying drawings, in which like referenced characters refer to like parts throughout, and in which:

FIG. 5 is a cross-sectional view of a magnetic data storage medium encoded with a set of machine-executable instructions for performing the method according to the present invention for configuring a programmable integrated circuit device to implement multi-die interconnect; and FIG. 6 is a cross-sectional view of an optically readable data storage medium encoded with a set of machine executable instructions for performing the method according to the present invention for configuring a programmable integrated circuit device to implement multi-die interconnect.

DETAILED DESCRIPTION

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

The drawings described herein show illustrative embodiments; however, the drawings may not necessarily show and may not be intended to show the exact layout of the hardware components contained in the embodiments. The embodiments disclosed herein may be implemented with any suitable number of components and any suitable layout of components in accordance with principles known in the art.

Figure 1:
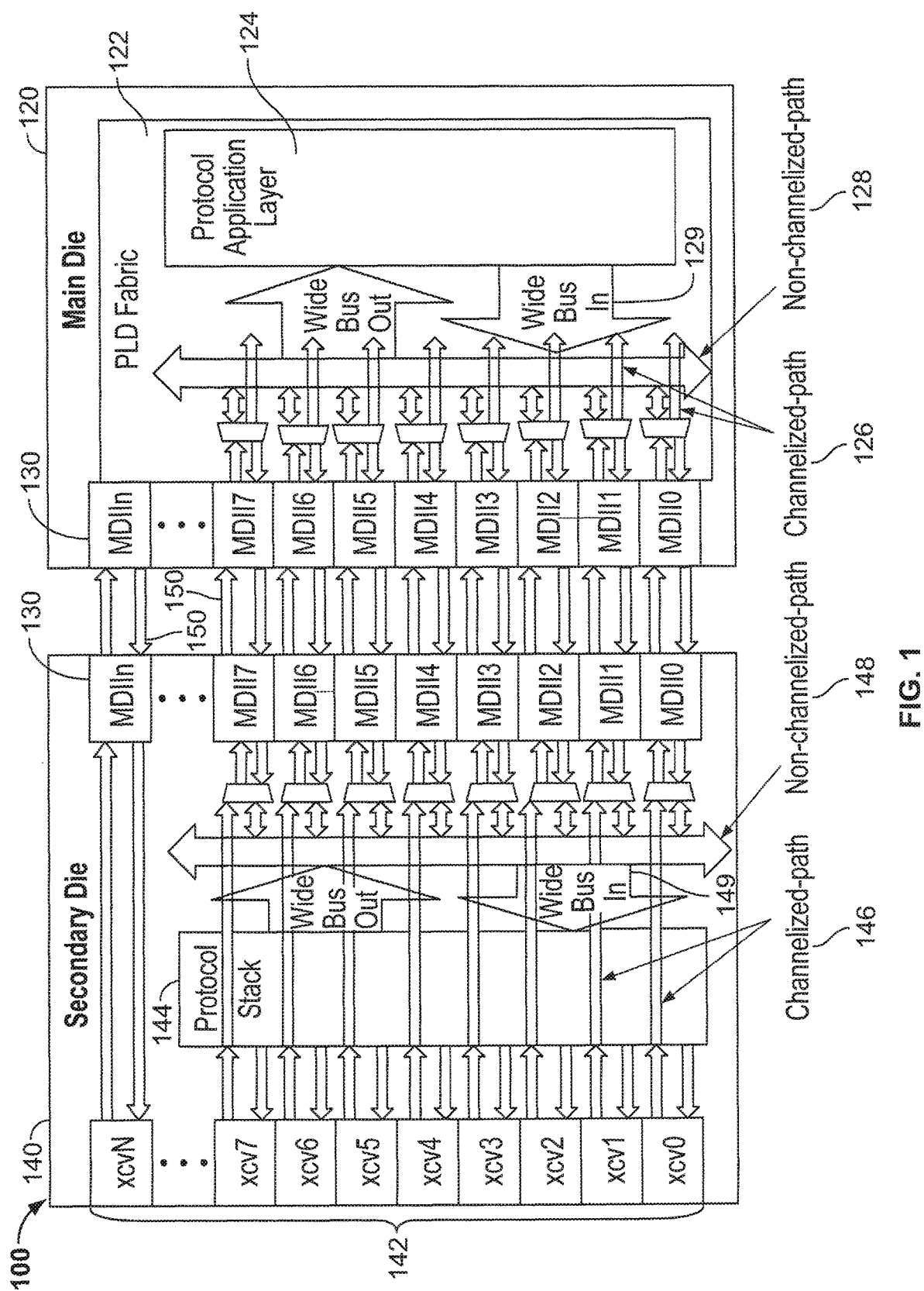
FIG. 1 shows a circuit diagram of a multi-die interconnect interface across two IC dies in accordance with an embodiment of the invention.

FIG. 1 shows a circuit diagram of a multi-die interconnect interface across two IC dies. Multi-die device 100 may include main die 120 and secondary die 140, which are in communication with each other via a multi-die interconnect. The multi-die interconnect may be implemented as a channelized interface. For example, the channelized multi-die interconnect interface may include multi-die interconnect interface (MDII) 130 (e.g., MDII0, MDII1, . . . MDIIN of FIG. 1) and multi-die interconnect channels (MDIC) 150. The channelized multi-die interconnect interface can, for example, be the 2.5D multi-die interface available from Altera Corporation, of San Jose, Calif., and can be implemented on both main die 120 and secondary die 140. Data signals communicated on a channel of MDIC 150 may herein be referred to as a stream of data signals, or a data stream. The channelized multi-die interconnect interface is capable of supporting multiple data streams concurrently.

A programmable logic device (PLD) fabric, such as PLD fabric 122, can be implemented on main die 120. A number of transceiver channels 142 can be implemented on secondary die 140. By way of channelized paths 146, MDIC 150, and channelized paths 126, transceiver channels 142 on secondary die 140 can be bridged into PLD fabric 122 on main die 120. In some embodiments, the channelized multi-die interconnect interface (MDII 130 and MDIC 150) is defined to be a per-channel interconnect (e.g., 96 pins per channel) in order to allow transceiver channels 142 to be bridged into PLD fabric 122. For example, channel 7 (e.g., XCV7) of transceiver channels 142 may have a one-to-one relationship with a channel of the channelized multi-die interconnect interface, such as MDII7, when the transceiver channel is bridged into PLD fabric 122. In some embodiments, the channelized multi-die interconnect interface is a bidirectional interface. For example, the 96 pins per channel in the MDIC 150 can operate in both the main-to-secondary direction and the secondary-to-main direction.

In addition to transceiver channels 142, a protocol application layer stack 144, such as Peripheral Component Interconnect Express (PCIe) stack, and its application interface can also be provided on secondary die 140 in order for secondary die 140 to engage in protocol application layer communication directly with protocol application layer 124 on main die 120. In some embodiments, protocol application layer 124 requires a wide communication bus (e.g., over 1,200 pins), such as non-channelized paths 128 and 148.

Each channel of MDIC 150 can support three different classes of data signals:
1) source-synchronous data;
2) memory-mapped data used, e.g., in a high-speed time-domain multiplexed (TDM) interface; and
3) asynchronous out-of-band data signals as used in a serial-shift chain.

For example, out of the 96 pins in a channel of MDIC 150, 6 pins may be purposed for asynchronous serial-shift chain communication, 20 pins may be reserved for memory-mapped data, and the remaining 70 pins may be used for source-synchronous data as well as various transfer clocks and asynchronous reset signals.

These three classes of data signals may be implemented differently and serve different functions. The source-synchronous data is data that arrives at a deterministic time and that includes a clock signal (a "strobe") which is independent of the receiving system clock. Source-synchronous data transfers can often attain higher transfer rates than a scheme that implements global clock source topology. The high-speed TDM interface handles synchronous transfers of memory-mapped data between a source and a sink (e.g., a protocol layer FIFO and an interconnect interface FIFO on secondary die 140). For example, as will be illustrated in relation to FIG. 2, application interface Tx FIFO 246 is a protocol layer FIFO and multi-die interconnect interface Tx FIFO 230$n$ is an interconnect interface FIFO. Lastly, the asynchronous serial-shift chain, such as serial-shift chain 260 of FIG. 2, allows asynchronous handshake signals (e.g., a "transfer ready" signal or a "FIFO empty" flag) to be communicated between the protocol stack and a PLD fabric application logic so that proper communication of parallel data can be established prior to any communication occurs on the FIFO blocks.

The protocol stack 144 utilizes the existing channelized multi-die interconnect interface (MDII 130 and MDIC 150) in order to bridge its non-channelized application interface into main die 120. As discussed above, the non-channelized application interface may require a wide communication bus (e.g., over 1200 pins) whereas, in the example shown, each channel of MDIC 150 may have a relatively small bandwidth (e.g., 96 pins). Consequently, the pin count limitation of the channelized multi-die interconnect interface may require secondary die 140 to communicate protocol application layer data with main die 120 across multiple channels in MDIC 150. However, whenever a particular channel (e.g., MDII7 of FIG. 1) is being used for a protocol application layer communication, some or all of the other channels in MDIC 150 may lose their capability to perform other functions. For example, a PCIe x1 lane uses only one transceiver; however, its corresponding PCIe protocol stack may require sixteen channels in MDIC 150 in order to function. The user would thus lose fifteen transceiver channels that could have been used for other purposes, because all sixteen channels of transceiver interface 142 would become unavailable to other modules whenever protocol stack 144 is enabled. The present invention can reduce the number of channels in the channelized multi-die interconnect interface that are utilized to implement a protocol application layer communication.

Another issue with data communication on channelized interfaces (e.g., MDII 130 and MDIC 150) arises from the fact that these channels are, by nature, asynchronous. MDII 130 and MDIC 150 may introduce skew to a wide bus of data driven through each independent asynchronous interconnect FIFO within the channelized interface. The present invention can reduce or eliminate skew in the middle of the wide bus of data transmitted via MDIC 150.

Lastly, each die on multi-die device 100 may have an independent reset interface, and therefore may be configured to wake up at different times due to their varying reset periods. Any data signals exchanged between main die 120 and secondary die 140 prior to the end of both reset periods are indeterminate. Accordingly, data communication should be gated until both dies have exited the reset period.

The foregoing disclosure in relation to FIG. 1 discusses an exemplary multi-die device where a multi-die interconnect is needed for protocol application layer communication. A number of existing issues and design challenges are also laid out, for which solutions will be presented below in relation to FIG. 2.

Figure 2:
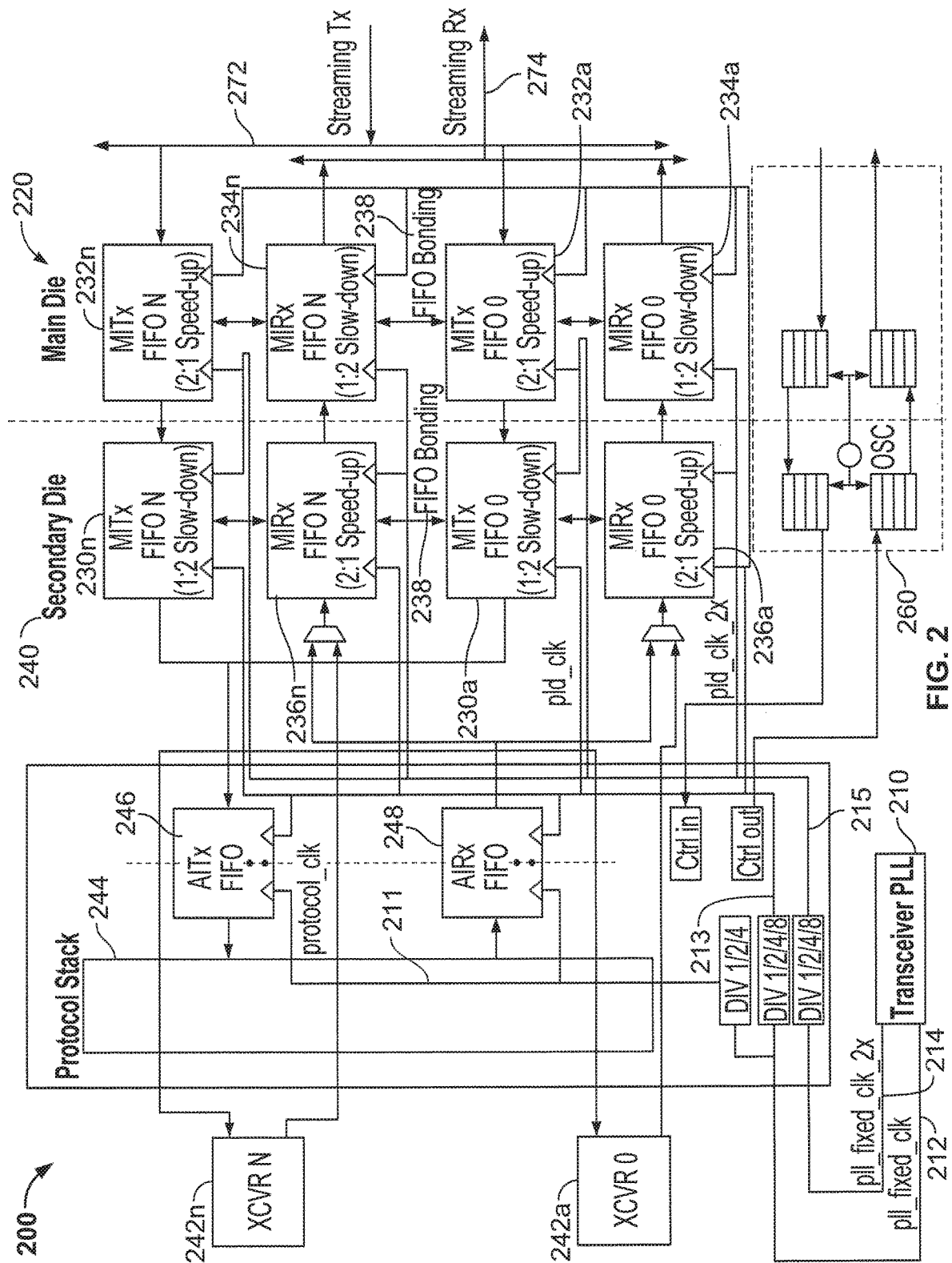
FIG. 2 shows an implementation of circuit channels in the multi-die interconnect interface in accordance with an embodiment of the invention.

FIG. 2 shows an implementation of circuit channels in the multi-die interconnect interface in accordance with an embodiment of the invention. More specifically, FIG. 2 includes circuit diagram 200 which shows implementation details of certain elements of multi-die device 100 as described in relation to FIG. 1. FIG. 2 includes main die 220 and secondary die 240, which correspond to main die 120 and secondary die 140, respectively.

A number of multi-die interconnect interface FIFOs, such as multi-die interconnect interface Tx (MITx) FIFOs 232$a$ . . . 232$n$ and multi-die interconnect interface Rx (MIRx) FIFOs 234$a$ . . . 234$n$, reside on main die 220. Although only two MITx FIFOs and MIRx FIFOs are shown in FIG. 2, any number of such FIFOs may be implemented without deviating from the scope of the present invention.

On secondary die 240, a protocol stack 244, transceiver channels 242$a$ . . . 242$n$, as well as a number of MITx FIFOs 230$a$ . . . 230$n$ and MIRx FIFO 236$a$ . . . 236$n$ are implemented. Protocol stack 244 substantially corresponds to protocol stack 144 of FIG. 1. Transceiver channels 242$a$ . . . 242$n$ substantially correspond to transceiver channels 142 of FIG. 1. The multi-die interconnect interface FIFOs implemented on both main die 220 and secondary die 240, as well as serial-shift chain 260, are circuit level implementations of the channelized multi-die interconnect interface (i.e., MDII 130 and MDIC 150) of FIG. 1.

Protocol stack 244 implemented on secondary die 240 may be in communication with two protocol layer FIFOs: application interface transmit (AITx) FIFO 246 and application interface receive (AIRx) FIFO 248. AITx FIFO 246 receives data signals from MITx FIFOs 230$a$ . . . 230$n$ to relay to protocol stack 244, whereas AIRx FIFO 248 transmits data signals from protocol stack 244 to MIRx FIFOs 236$a$ . . . 236$n$. As previously illustrated in relation to FIG. 1, the protocol layer FIFOs 246 and 248 may be referred to as a source and the multi-die interconnect interface FIFOs 230 and 236 may be referred to as a sink for the interface shown in FIG. 2.

In an exemplary embodiment, protocol stack 244 requires a wide synchronous protocol data bus (e.g., 256-bit) for communication with protocol application layer logic implemented on PLD fabric 122. The synchronous protocol data bus is associated with a number of control pins, such as Start-of-Packet (SOP), End-of-Packet (EOP), Valid, and Ready. SOP is asserted by the source to mark the beginning of a packet. EOP is asserted by the source to mark the end of a packet. Valid is asserted by the source to qualify all other source-to-sink signals. The sink samples source-to-sink signals only on cycles where Valid is asserted; all other cycles are ignored. Lastly, Ready is asserted by the sink to indicate that the sink can accept data. The source may only assert Valid and transfer data during Ready cycles.

As previously discussed in relation to FIG. 1, data channels in multi-die interconnect channels 150 may introduce skew because the data channels operate independently of each other. To resolve this issue and eliminate the skew in the data bus, multiple channels in the channelized multi-die interconnect interface may be bonded together by a synchronization signal (e.g., the read/write enable signal of each FIFO block in the multi-die interconnect interface). In some embodiments, the synchronization signal can be passed along FIFO bonding connection 238.

As a result of the synchronized operation of these otherwise asynchronous and independent data channels, data and control pins (e.g., SOP, EOP, Ready, Valid, etc. as discussed before) can be distributed across multiple channels of the multi-die interconnect interface, because the multiple channels are effectively bonded into a same bundle. Any number of data channels in the multi-die interconnect interface (i.e., MDII 130 and MDIC 150) may be bonded together. In this manner, the unused data channels can be used for other functions, or be repurposed for other protocol application layer communications.

Transceiver channels 242$a$ . . . 242$n$ may be coupled with the interconnect FIFOs by way of multiplexing units in order to receive and transmit source-synchronous data. In the absence of protocol application layer communications, each transceiver channel may be in communication with one or more MITx FIFOs 230$a$ . . . 230$n$ to receive data, and with one or more MIRx FIFOs 236$a$ . . . 236$n$ to transmit data.

Transceiver phase-locked loop (PLL) 210 can be implemented on multi-die device 100 to provide different clock signals to the multi-die communication interface. In particular, transceiver PLL 210 may provide two clock signals: a PLL fixed clock 212 and a PLL fixed clock 2× 214. PLL fixed clock 2× 214 runs at substantially twice the rate of PLL fixed clock 212.

PLL fixed clock 212 may optionally be subdivided to generate protocol clock signal 211 and interconnect 1× clock signal 213. PLL fixed clock 2× 214 may optionally be subdivided to generate interconnect 2× clock signal 215. Protocol clock signal 211 is used to drive the operation of the protocol layer FIFOs (e.g., AITx FIFO 246 and AIRx FIFO 248). Interconnect 1× clock signal 213 and interconnect 2× clock signal 215 are collectively used to facilitate the interconnect FIFOs on both main die 220 and secondary die 240 to support data pin compression and phase compensation.

The interconnect FIFOs operate in a phase compensation mode, with a 2:1 speed-up implemented across the channels in multi-die interconnect channels 150. The 2:1 speed-up is initiated by MITx FIFOs 232$a$ . . . 232$n$ on main die 220 and MIRx FIFOs 236$a$ . . . 236$n$ on secondary die 240, using the 2× relationship between interconnect 1× clock signal 213 and interconnect 2× clock signal 215. At the other end of the channels in multi-die interconnect channels 150, MITx FIFOs 230$a$ . . . 230$n$ on secondary die 240 and MIRx FIFOs 234$a$ . . . 234$n$ implements a 1:2 slow-down. The 2:1 speed-up and the 1:2 slow-down are used to minimize the number of required pins for a given wide bus communication, and require a 2× clock (e.g., interconnect 1× clock signal 213 and interconnect 2× clock signal 215) to drive the source-synchronous interconnect transfer. In some embodiments, the interconnect FIFOs with the 2× (i.e., 2:1) speed-up appear as an extra latency in the protocol path.

As discussed above, the source (e.g., protocol FIFOs) may only assert Valid and transfer data during Ready cycles as asserted by the sink (e.g., interconnect FIFOs 150). The Ready→Valid back-pressure latency indicates the number of cycles from the time that Ready is asserted until Valid data can be driven. As a result of the extra latency due to the 2× speed-up across the interconnect FIFOs, the protocol layer FIFOs (e.g., AITx FIFO 246 and AIRx FIFO 248) should have enough space to account for the increased Ready→Valid back-pressure latency.

In addition to protocol stack 244 and the FIFOs, circuit diagram 200 may also include serial-shift chain 260. Various user control status information, such as the FIFO empty flag, may be communicated across serial-shift chain 260 in order to initialize the IC dies prior to data communications commence on the channels of multi-die interconnect interface.

Figure 3:
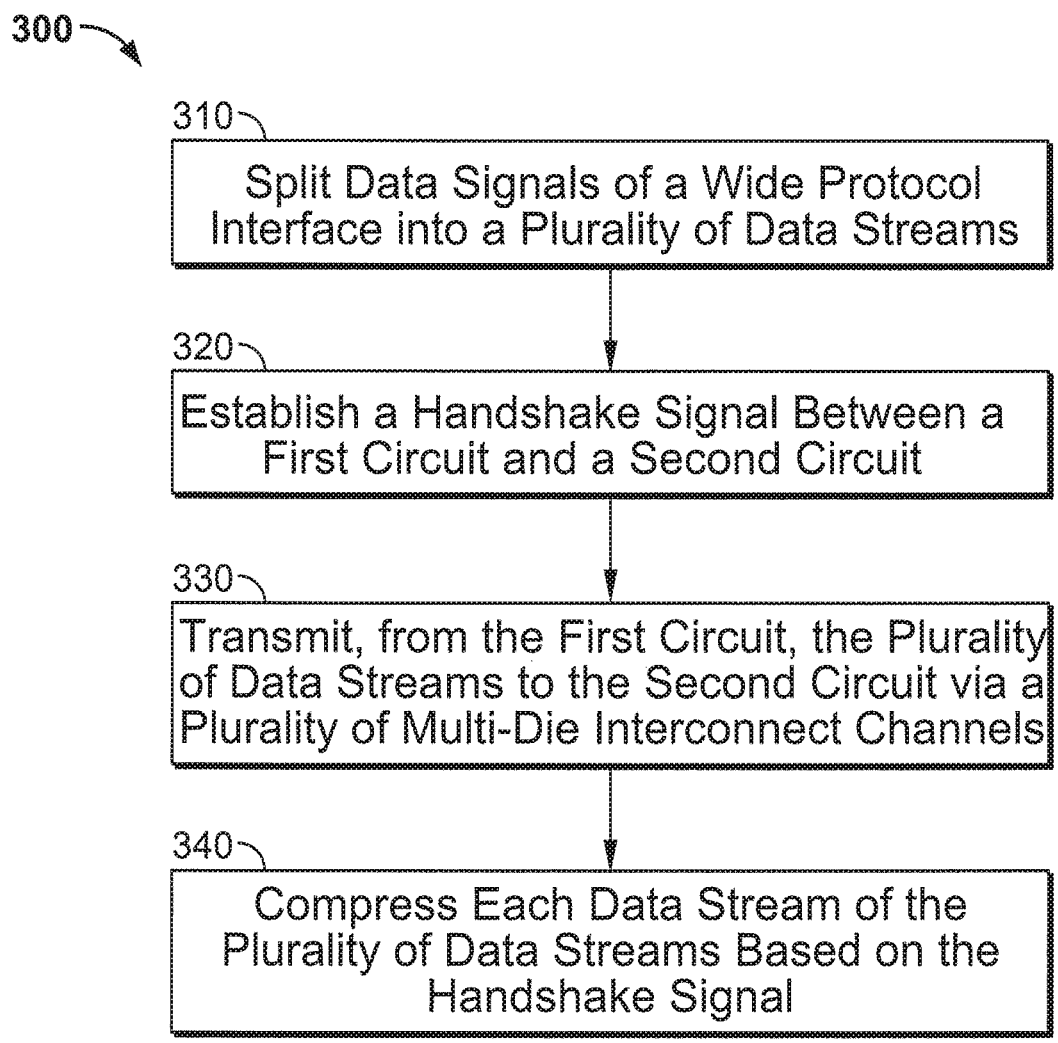
FIG. 3 is a flow diagram of a method according to an embodiment of the present invention for implementing a multi-die interconnect interface between two IC dies of a multi-die device.

A method according to an embodiment of the present invention for implementing a multi-die interconnect between two IC dies of a multi-die device is diagrammed in FIG. 3. At 310, data signals of a wide-protocol interface are split into a plurality of data streams. At 320, a handshake signal is established between a first circuit and a second circuit. In some embodiments, control signals (e.g., the handshake signal) gate the interface signals until both dies have exited their respective reset periods. During normal operation, additional control (handshake) signals govern the handshaking process between the two dies (e.g., main die 220 and secondary die 240), such that the Ready and Valid signals are set only at the appropriate moment. In some embodiments, an asynchronous serial-shift chain (e.g., serial-shift chain 260) is required to pass control (handshake) information between the two dies. At 330, the plurality of data streams are transmitted from the first circuit to the second circuit via a plurality of channels of the multi-die interconnect interface. At 340, each data stream of the plurality of data streams is compressed based on the handshake signal.

As previously discussed, the plurality of channels of the multi-die interconnect interface are bonded in order to reduce skew in the plurality of data streams. FIFO bonding may be achieved by running a shared synchronization signal through multiple asynchronous FIFO blocks. For example, a first FIFO block (e.g. MITx FIFO 230n) may be a master block that generates a synchronization signal. The synchronization signal can be fed into other FIFO blocks (e.g., MIRx FIFO 236n and MITx FIFO 230a) by way of FIFO bonding 238. In some embodiments, the synchronization signal controls the read/write enables of the parallel asynchronous FIFO blocks. In this manner, the asynchronous FIFO blocks, which reside on independent and parallel channels of the multi-die interconnect interface, can operate in a synchronized manner to carry data streams across IC dies, thereby eliminating skew, as caused by the independent asynchronous resets, on the data streams.

As previously illustrated, serial-shift chains, such as serial-shift chain 260, can provide an alternate path for asynchronous control and handshaking signals (e.g., FIFO empty flag), which should be established prior to the data streams are transmitted via the FIFO blocks. Serial-shift chain 260 employs an independent oscillator to oversample the asynchronous control and handshaking signals in order to initialize both IC dies.

Thus it is seen that a system and a method for implementing a multi-die interconnect between two IC dies have been provided.

Figure 4:
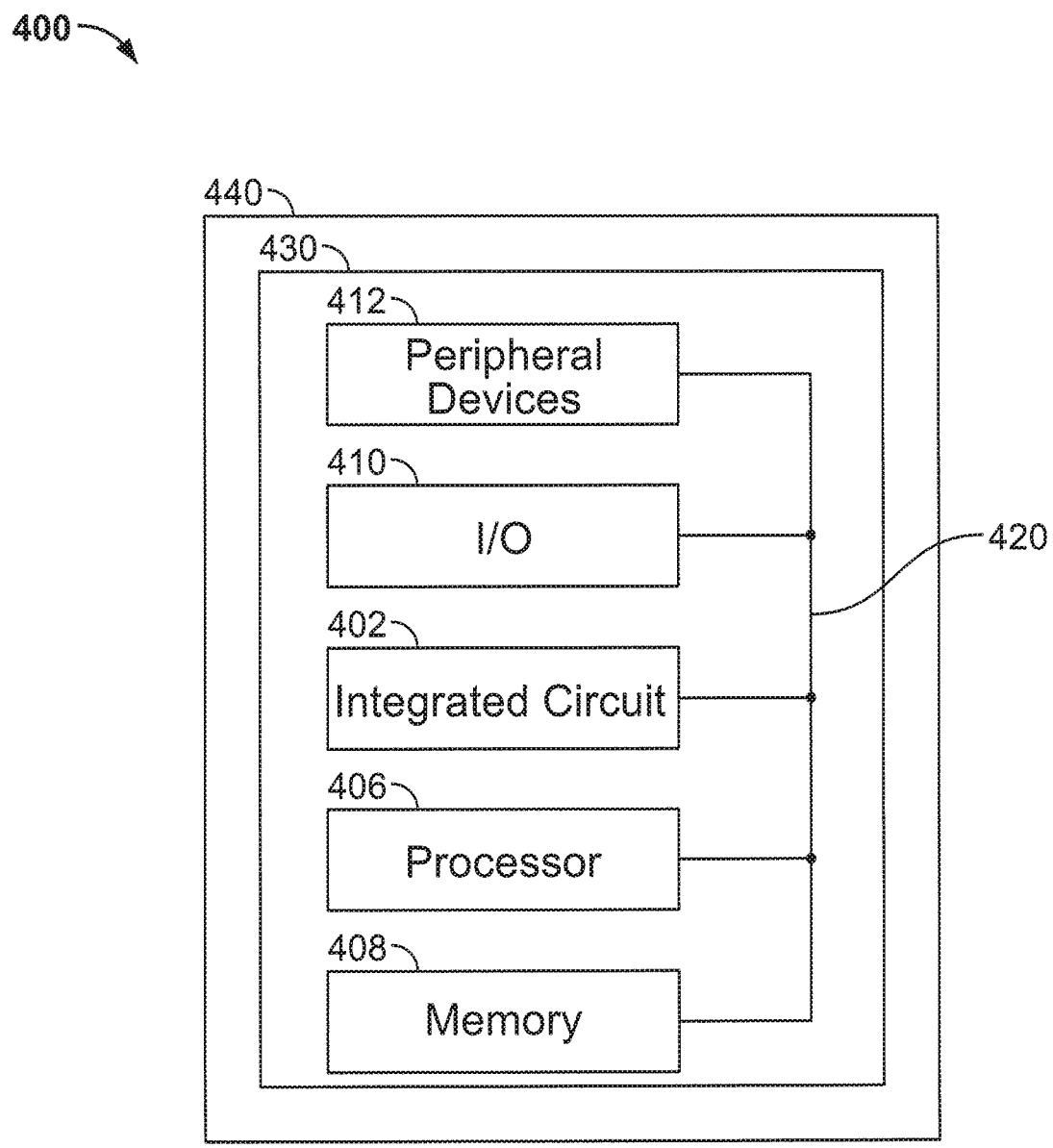
FIG. 4 is a simplified block diagram of an illustrative system employing an integrated circuit device in accordance with an embodiment of the present invention.

FIG. 4 illustrates a circuit or other device 402 that includes embodiments of a circuitry designed or configured based on the model described herein within a data processing system 400. In an embodiment, integrated circuit or device 402 may be an integrated circuit, application specific standard product (ASSP), application specific integrated circuit (ASIC), programmable logic device (PLD) (including a Field-Programmable Gate Array (FPGA), full-custom chip, or a dedicated chip). In some embodiments, element 402 may be configured as multi-die device 100, main die 120, or secondary die 140. Data processing system 400 may include one or more of the following components: circuit 402, processor 406, memory 408, I/O circuitry 410, and peripheral devices 412. These components are connected together by a system bus or other interconnections 420 and are populated on a circuit board 430 which is contained in an end-user system 440.

System 400 could be used in a wide variety of applications, such as communications, computer networking, data networking, instrumentation, video processing, digital signal processing, or any other application where the advantage of using programmable or reprogrammable logic is desirable. Circuit 402 may be used to perform a variety of different logic functions. In some embodiments, circuit 402 may be configured as a processor or controller that works in cooperation with processor 406. Circuit 402 may also be used as an arbiter for arbitrating access to a shared resource in system 400. In yet another example, circuit 402 can be configured as an interface between processor 406 and one of the other components in system 400. It should be noted that system 400 is only exemplary, and that the true scope and spirit of the invention should be indicated by the following claims.

Although components in the above invention are described as being connected with one another, they may instead be connected to one another, possibly via other components in between them. It will be understood that the foregoing are only illustrative of the principles of the invention, and that various modifications can be made by those skilled in the art without departing from the scope and spirit of the invention. One skilled in the art will appreciate that the present invention can be practiced by other than the described embodiments, which are presented for purposes of illustration and not of limitation, and the present invention is limited only by the claims that follow.

Instructions for carrying out a method according to this invention for programming a programmable device to implement a multi-die interconnect interface may be encoded on a machine-readable medium, to be executed by a suitable computer or similar device to implement the method of the invention for programming or configuring PLDs or other programmable devices. For example, a personal computer may be equipped with an interface to which a PLD can be connected, and the personal computer can be used by a user to program the PLD using suitable software tools as described above FIG. 5 presents a cross section of a magnetic data storage medium 500 which can be encoded with a machine executable program that can be carried out by systems such as the aforementioned personal computer, or other computer or similar device. Medium 500 can be a floppy diskette or hard disk, or magnetic tape, having a suitable substrate 501, which may be conventional, and a suitable coating 502, which may be conventional, on one or both sides, containing magnetic domains (not visible) whose polarity or orientation can be altered magnetically. Except in the case where it is magnetic tape, medium 500 may also have an opening (not shown) for receiving the spindle of a disk drive or other data storage device.

The magnetic domains of coating 502 of medium 100 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

FIG. 6 shows a cross section of an optically-readable data storage medium 510 which also can be encoded with such a machine-executable program, which can be carried out by systems such as the aforementioned personal computer, or other computer or similar device. Medium 510 can be a conventional compact disk read-only memory (CD ROM) or digital video disk read-only memory (DVD ROM) or a rewriteable medium such as a CD R, CD RW, DVD R, DVD RW, DVD+R, DVD+RW, or DVD-RAM or a magneto-optical disk which is optically readable and magneto-optically rewriteable. Medium 510 preferably has a suitable substrate 511, which may be conventional, and a suitable coating 512, which may be conventional, usually on one or both sides of substrate 511.

In the case of a CD-based or DVD-based medium, as is well known, coating 512 is reflective and is impressed with a plurality of pits 513, arranged on one or more layers, to encode the machine-executable program. The arrangement of pits is read by reflecting laser light off the surface of coating 512. A protective coating 514, which preferably is substantially transparent, is provided on top of coating 1512.

In the case of magneto-optical disk, as is well known, coating 512 has no pits 513, but has a plurality of magnetic domains whose polarity or orientation can be changed magnetically when heated above a certain temperature, as by a laser (not shown). The orientation of the domains can be read by measuring the polarization of laser light reflected from coating 512. The arrangement of the domains encodes the program as described above.

It will be understood that the foregoing is only illustrative of the principles of the invention, and that various modifications may be made by those skilled in the art without departing from the scope and spirit of the invention, and the present invention is limited only by the claims that follow. For example, the various inventive aspects that have been discussed herein can either all be used together in certain embodiments, or other embodiments may employ only one or more (but less than all) of the inventive aspects. And if multiple (but less than all) of the inventive aspects are employed, that can involve employment of any combination of the inventive aspects. As another example of possible modifications, throughout this invention, particular numbers of components used in controllers are mentioned. These particular numbers are only examples, and other suitable parameter values can be used instead if desired.

What is claimed is:

1. A single package multi-die electronic device comprising:
    a communication bus comprising a plurality of channels and a clock signal line;
    a first die comprising a first bus interface coupled to the communication bus; and
    a second die comprising a second bus interface coupled to the communication bus, data processing circuitry that exchanges data with the first die over the communication bus, and data transfer circuitry that couples the second bus interface to the data processing circuitry;
    wherein the plurality of channels comprise a first subplurality of unidirectional channels from the first bus interface to the second bus interface and a second subplurality of unidirectional channels from the second bus interface to the first bus interface, the first bus interface provides source synchronous data to the second bus interface using the communication bus, the second bus interface comprises circuitry that synchronizes a plurality of data signals of the source synchronous data by latching the received source synchronous data using a received clock signal, and the data exchanged over the communication bus is communicated at a first data rate that is an integer ratio of a second data rate of the data transfer circuitry.

2. An electronic device comprising a single package multi-die electronic device comprising data processing circuitry, wherein the single package multi-die electronic device comprises:
    a communication bus comprising a plurality of unidirectional single-ended data lines;
    a first die comprising a first clock domain region associated with a first communication bus interface circuit of the first die and a second clock domain region associated with data transfer circuitry that couples the first communication bus interface with the data processing circuitry of the first die; and
    a second die that transmits and receives data with the first die over the single-ended data lines of the communication bus using a second communication bus interface circuit, wherein the first clock domain comprises a first clock that provides a first bit rate, the second clock domain comprises a second clock that provides a second bit rate, and the first bit rate is a ratio of the second bit rate.

3. The single package multi-die electronic device of claim 1, comprising a first clock domain associated with the first bus interface and a second clock domain associated with the data processing circuitry.

4. The single package multi-die electronic device of claim 1, wherein the integer ratio comprises a 2:1 ratio, a 1:2 ratio, a 4:1 ratio, a 1:4 ratio, a 8:1 ratio, or a 1:8 ratio.

5. The single package multi-die electronic device of claim 1, wherein the data transfer circuitry comprises queueing circuitry.

6. The single package multi-die electronic device of claim 1, wherein the first die comprises a first control circuitry, the second die comprises a second control circuitry communicatively coupled to the first control circuitry, and the first control circuitry and the second control circuitry manages the first interface and the second interface.

7. The single package multi-die electronic device of claim 6, wherein the first control circuitry and the second control circuitry employ a synchronous control protocol that comprises validity information.

8. The single package multi-die electronic device of claim 1, wherein the source synchronous data comprises peripheral component express (PCIe) data and memory data.

9. The electronic device of claim 2, wherein the ratio comprises a 2:1 ratio, a 1:2 ratio, a 4:1 ratio, a 1:4 ratio, a 8:1 ratio, or a 1:8 ratio.

10. The electronic device of claim 2, wherein the second die is coupled to a memory device, and wherein the data exchanged between the second die and the first die comprises memory data exchanged with the memory device.

11. The electronic device of claim 2, wherein the second die is coupled to an external device over a Peripheral Component Interface Express (PCIe) data link, and wherein the data exchanged between the second die and the first die comprises PCIe data transmitted over the PCIe data link.

12. The electronic device of claim 2, wherein the communication bus comprises a clock signal line, and wherein the data exchanged between the first die and the second die comprises source synchronous data.

13. The electronic device of claim 2, wherein the first die comprises a first control circuitry, the second die comprises a second control circuitry communicatively coupled to the first control circuitry, and the first control circuitry and the second control circuitry manage the first communication bus interface circuit and the second communication bus interface circuit.

14. The electronic device of claim 13, wherein the first control circuitry and the second control circuitry communicate using a synchronous control protocol that comprises validity information.

15. The electronic device of claim 2, wherein the data transfer circuitry comprises queueing circuitry.

16. A method to transmit data from a first die to a second die of a single package multi-die electronic device comprising:

transmitting data to first bus interface circuitry of the first die at a first data rate, wherein the data comprises peripheral component express (PCIe) data and memory data;

adjusting, at the first bus interface circuitry, the data to a second data rate;

transmitting the converted data over a communication bus from the first bus interface circuitry to second bus interface circuitry of the second die;

adjusting, at the second bus interface circuitry, the received data from the second data rate to the first data rate; and transmitting the received data to processing circuitry of the second die at the first data rate over data transfer circuitry.

17. The method of claim 16, wherein adjusting the data from a first data rate to a second data rate comprises a 1:2 conversion speed up or a 2:1 conversion slow down.

18. The method of claim 16, comprising adding the received data to queueing circuitry of the data transfer circuitry.

19. The method of claim 16, comprising transmitting a status signal of the communication bus, wherein the status signal comprises validity information.

20. The method of claim 16, comprising:

transmitting a clock signal from the first die to the second die simultaneously with the converted data; and latching the received data at the second bus interface circuitry using the transmitted clock signal.

21. The method of claim 16, wherein the memory data comprises double data rate (DDR) data.

22. The method of claim 16, wherein the PCIe data is transmitted before the memory data or after the memory data.

\* \* \* \* \*